United States Patent
Ahn et al.

(10) Patent No.: US 10,343,494 B2
(45) Date of Patent: Jul. 9, 2019

(54) AIR VENT FOR VEHICLE

(71) Applicants: Hyundai Motor Company, Seoul (KR); NIFCO KOREA Inc., Asan, Chungcheongnam-do (KR); Hyundai Mobis Co., Ltd., Seoul (KR)

(72) Inventors: Gye Young Ahn, Seoul (KR); Seung Sik Han, Gyeonggi-do (KR); Jae Whoan Park, Chungcheongnam-do (KR); Kwan Woo Lee, Busan (KR); Ji Won Lee, Chungcheongnam-do (KR)

(73) Assignees: Hyundai Motor Company, Seoul (KR); NIFCO KOREA Inc., Asan, Chungcheongnam-do (KR); Hyundai Mobis Co., Ltd., Seoul (KR)

( * ) Notice: Subject to any disclaimer, the term of this patent is extended or adjusted under 35 U.S.C. 154(b) by 109 days.

(21) Appl. No.: 15/335,042

(22) Filed: Oct. 26, 2016

(65) Prior Publication Data

US 2017/0166035 A1 Jun. 15, 2017

(30) Foreign Application Priority Data

Dec. 10, 2015 (KR) .................. 10-2015-0176217

(51) Int. Cl.
*B60H 1/34* (2006.01)
(52) U.S. Cl.
CPC ..... *B60H 1/345* (2013.01); *B60H 2001/3464* (2013.01); *B60H 2001/3471* (2013.01)
(58) Field of Classification Search
CPC .................................................. B60H 1/345
See application file for complete search history.

(56) References Cited

U.S. PATENT DOCUMENTS

| 7,018,288 B2 * | 3/2006 | Okada ............... B60H 1/3421 454/155 |
| 2005/0239391 A1 * | 10/2005 | Shibata ............... B60H 1/3421 454/155 |

FOREIGN PATENT DOCUMENTS

| EP | 1457371 A1 * | 9/2004 | ............ B60H 1/345 |
| JP | H05-58148 A | 3/1993 | |
| JP | H05-58184 A | 3/1993 | |
| JP | 2002-293133 A | 10/2002 | |
| JP | 2008-037379 A | 2/2008 | |
| JP | 2012-052431 A | 3/2012 | |
| JP | 2013-241110 A | 12/2013 | |
| JP | 2014-227014 A | 12/2014 | |
| KR | 2013-0038564 A | 4/2013 | |
| KR | 2015-0068900 A | 6/2015 | |

OTHER PUBLICATIONS

EP 1457371 MT; machine translation of EP 1457371 A1.*

* cited by examiner

*Primary Examiner* — Gregory L Huson
*Assistant Examiner* — Elizabeth M. May
(74) *Attorney, Agent, or Firm* — Mintz Levin Cohn Ferris Glovsky and Popeo, P.C.; Peter F. Corless

(57) ABSTRACT

An air vent for a vehicle is provided. In particular, a diffusion air vent for a vehicle discharges air in a concentrated and diffused manner by controlling a discharge direction of the air. The air vent concentratedly and diffusedly discharges air by an air discharge mode change mechanism based on a dial rotation operation. Further, a damper is configured to be opened or closed based on the dial rotation operation to permit and interrupt air discharge.

8 Claims, 11 Drawing Sheets

- DAMPER CLOSED -

- CONCENTRATION MODE -
(DAMPER OPENED AND DIFFUSER FAN ARRANGED STRAIGHT)

- DIFFUSION MODE -
(DAMPER OPENED AND DIFFUSER FAN ARRANGED DIAGONALLY)

AIR VENT FOR VEHICLE

CROSS-REFERENCE TO RELATED APPLICATION

This application claims under 35 U.S.C. § 119(a) the benefit of priority to Korean Patent Application No. 10-2015-0176217 filed on Dec. 10, 2015, the entire contents of which are incorporated herein by reference.

BACKGROUND (a) Technical Field

The present disclosure relates to an air vent for a vehicle, and more particularly, to a diffusion air vent for a vehicle capable of discharging air in a concentrated and diffused manner by adjusting a discharge direction of the air.

(b) Background Art

Recently, a cluster and an audio, video, navigation (AVN) apparatus disposed within an inner of a vehicle have increased in size and a mounting position of an air vent through which air generated by an operation of an air conditioner and a heater is discharged has generally been disposed on a lower area of a center-facia panel. Accordingly, cooling or heating air discharged through the air vent is not uniformly distributed throughout the inner of the vehicle.

For example, when the air vent is positioned under a position of a driver's hand holding a steering wheel, the heated air is not directly discharged toward the driver's hand during the colder weather. As a result, a driver's hand may be subject to insufficient heating and a freezing problem may occur. Further, when the air discharged through the air vent is discharged straight and thus directly contacts a driver's and passenger's skin, xeroderma may occur. Therefore, a diffusion function of air discharged through the air vent, in other words, a diffusion function that uniformly spreads air over the inner of the vehicle, is required.

The above information disclosed in this section is merely for enhancement of understanding of the background of the invention and therefore it may contain information that does not form the prior art that is already known in this country to a person of ordinary skill in the art.

SUMMARY

The present invention provides an air vent for a vehicle capable of concentratedly discharging (e.g., linearly discharging) air and diffusedly discharging air by an air discharge mode change mechanism. The air discharge may be based on a dial rotation operation and may permit and block an air discharge that may be configured to perform an open and close operation mechanism of a damper based on the dial rotation operation.

Accordingly, in one aspect, the present invention provides an air vent for a vehicle. that may include a dial rotatably mounted at a first side of a front surface of an air vent housing, a rod hinge-connected to a rear surface of the dial and an outer rack plate having a front side of an inner surface provided with a first outer rack, a rear side of the inner surface provided with a second outer rack, and an outer surface hinge-connected to a rear end of the rod.

The outer surface may be configured to move forward and backward by the rod based upon a rotation of the dial. A power transmission gear member may be configured to move an inner spacer forward and backward while being rotated when the outer rack plate is configured to move forward and backward. An inner spacer may be coupled to the power transmission gear member and may be configured to be moved forward and backward.

A diffuser fan may have a first side end provided with a hinge pin hinge-connected to the inner spacer and a guide pin that extends at a position of a rear side of the hinge pin. An outer spacer may have a hollow structure provided with a guide aperture that may be configured to guide a linear movement and a diagonal movement of the guide pin and may be disposed at an outer of the inner spacer. A damper gear may be configured to engage with the second outer rack. A damper have a first side end coupled to a central shaft of the damper gear and a second side end hinge-connected to an inner wall of the air vent housing.

According to an exemplary embodiment of the present invention, the power transmission gear member may include a diffuser gear that may engage with the first outer rack. A diffuser shaft have a first side end fixed to a central shaft of the diffuser gear and an inner gear may be fixed to a second side end of the diffuser shaft. An inner rack may be configured to engage with the inner gear to move forward and backward. Furthermore, according to another exemplary embodiment of the present invention, both side surfaces of the inner rack may be integrally provided with inner spacer that may connect the bodies provided with slots and a rear surface of the inner spacer may be integrally formed with a fastening rod hinge-connected to the slots.

Furthermore, according to an exemplary embodiment of the present invention, the inner spacer may include a square ring shaped outer case. A partitioning bar integrally formed on an inner surface of the outer case while partitioning an inner space of the outer case into several portions and a fastening rod that may extend backward from a portion and inner side ends of each of the partitioning bars is integrally connected to be coupled to the inner rack. The outer case of the inner spacer and the fastening rod may include hinge apertures that fasten the hinge pins of the diffuser fan.

Additionally, according to an exemplary embodiment of the present invention, the guide aperture may be formed along a longitudinal direction of the outer spacer and a back section of the guide aperture may be formed as a straight section and a front section thereof may be formed as a diagonal section. In some exemplary embodiments of the present invention, the outer rack plate may include a slide aperture that penetrates therethrough and the slide aperture may have an outer rack cover coupled to a side surface of the air vent housing that may be configured to be slidably and movably inserted thereinto.

In other exemplary embodiments of the present invention, a wind angle of the outer spacer may be configured to be adjusted laterally. For example, each of upper and lower horizontal rotating bars may be hinge-connected between upper portions of front sides of a pair of outer spacers and between lower portions of the front sides thereof. The upper and lower horizontal rotating bars may be connected to each other by a vertical rotating bar, and the vertical rotating bar may be connected to a knob mounted on the front surface of the air vent housing that may be configured to transfer an operating force.

By the above configuration, the present invention has the following effects. The present invention may provide the function of concentratedly discharging (e.g., straight discharging) air and the function of diffusedly discharging air. The air discharge mode change mechanism may be based on the dial rotation operation and may be configured to open and close an air discharge mechanism of the damper based on the dial rotation operation to control the concentration and diffusion of the wind directions, thereby improving the quality of the air conditioner. Further, the user may selectively control the concentration and diffusion wind directions to maintain the desired the inner air.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
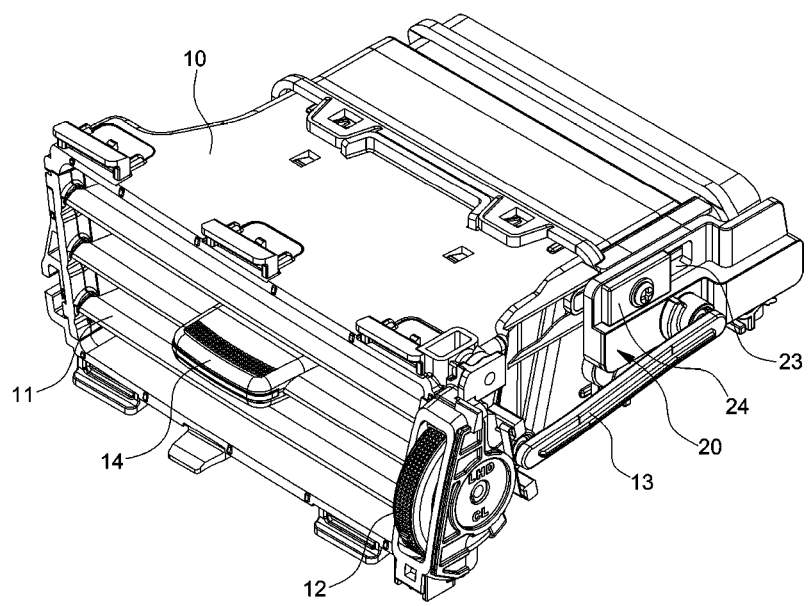
FIG. 1 is an exemplary perspective view illustrating an appearance of an air vent for a vehicle according to an exemplary embodiment of the present invention.
Figure 2:
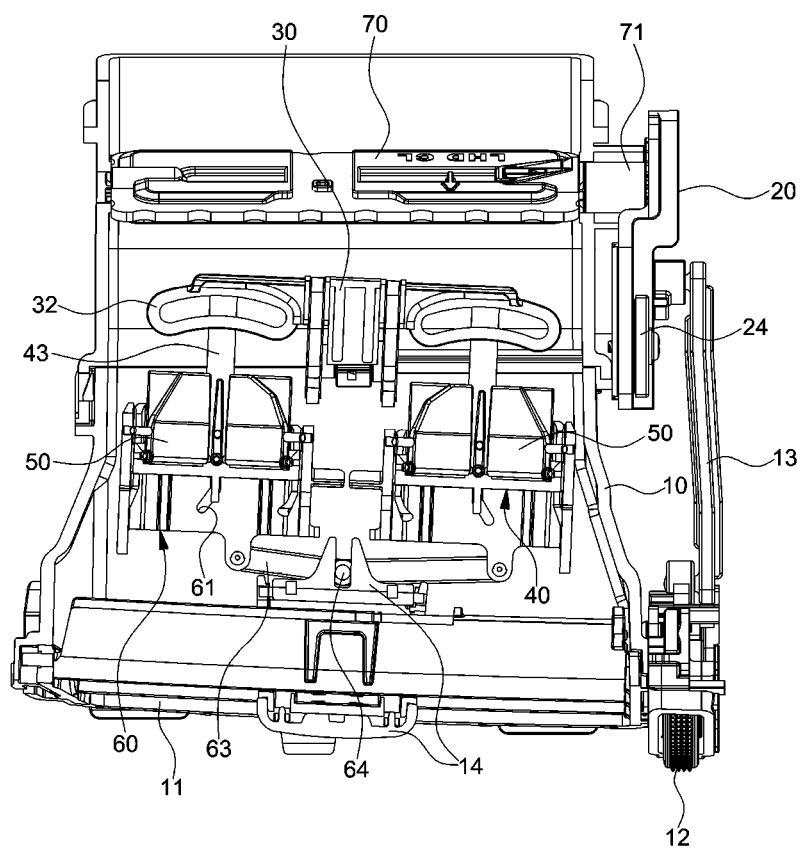
FIG. 2 is an exemplary cross-sectional view illustrating internal components of the air vent for a vehicle according to the embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is an exemplary perspective view illustrating an appearance of an air vent for a vehicle according to an exemplary embodiment of the present invention. FIGS. 2 to 5 are exemplary diagrams illustrating internal components of the air vent for a vehicle according to the exemplary embodiment of the present invention, in which reference numeral 10 represents an air vent housing.

In particular, front portion of the air vent housing 10 may be configured to be vertically rotated and may include a plurality of air guide member that may be configured to guide a discharge direction of air up and down. One of the air guide member 11 may be include a knob 14 that may be configured to rotate an angle of the air grill 11. Further, at a first side of the front portion of the air vent housing 10, a dial 12 may be configured to rotatably control a concentration mode or a diffusion mode of an air discharge mode.

A rear end portion of the dial 12 may be hinge-connected with a front end portion of a rod 13 and may have a predetermined length. The rod 13 may be configured to move horizontally (e.g., forward and backward) based on a rotation angle of the dial 12. In particular, the rear end portion of the rod 13 may be hinge-connected with an outer surface of an outer rack plate 20. The outer rack plate 20 may be an input element that may be configured to open and close a damper to adjust an air discharge mode to a concentration mode or a diffusion mode. For example, the outer rack plate 20 may have a structure with a front side of an inner side thereof that may include a first outer rack 21, a rear side of the inner surface thereof may include a second outer rack 22, and a slide aperture 23 may penetrate above an upper portion of the first outer rack 21.

The outer rack plate 20 may be configured to linearly move forward or backward by forward and backward forces of the rod 13. In particular, the rod 13 may be configured to move horizontally based on the rotation of the dial 12. For example, to constantly maintain a linear motion trajectory of the outer rack plate 20, the slide aperture 23 of the outer rack plate 20 may have an outer rack cover 24 assembled on a side surface of the air vent housing 10 that may be configured to be slidably and movably inserted thereinto. When the outer rack plate 20 moves forward or backward by the forward and backward forces of the rod 13, an inner spacer 40 may be configured to move horizontally by a power transmission gear member.

The power transmission gear member may be configured to provide a linear moving force to the inner spacer 40 while being rotated by the linear movement of the outer rack plate 20. Further, the power transmission gear member may include a diffuser gear 25 that may be configured to engage the first outer rack 21, a diffuser shaft 26 with a first side end fixed to a central shaft of the diffuser gear 25, an inner gear 27 fixed to a second side end of the diffuser shaft 26, and an inner rack 30 that may engage with the inner gear 27 to move forward and backward. In particular, the first outer rack 21 of the outer rack plate 20 may engage with the diffuser gear 25. The central shaft of the diffuser gear 25 may be connected to a first end portion of the diffuser shaft 26, and the inner gear 27 may be mounted at a second end portion of the diffuser shaft 26.

Accordingly, when the outer rack plate 20 is moved forward and backward, the diffuser gear 25 may engage with the first outer rack 21, and the diffuser shaft 26 may be connected to the diffuser gear 25. The inner gear 27 mounted at the second end portion of the diffuser shaft 26 may be configured to rotate about an angle simultaneously. In other words, the inner gear 27 may engage with the inner rack 30 to move forward.

Further, both side surfaces of the inner rack 30 may be integrally formed with inner spacer connecting bodies 32. The inner spacer connecting bodies 32 may include slots 31 that extend therethrough to be fastened with a fastening rod 43 of the inner spacer 40 by a hinge. The inner spacer 40 may include a square ring shaped outer case 41 that air passes through, a partitioning bar 42 that may be integrally formed on an inner surface of the outer case 41 to partition an internal space of the outer case 41 into a plurality of spaces to guide a flow of air, and the fastening rod 43 may extend backward from a portion where inner side ends of each of the partitioning bars 42 may be integrally connected.

In particular, a rear end portion of the fastening rod 43 may be hinge-connected to the slots 31 of the inner spacer connecting bodies 32 integrally formed on both side surfaces of the inner rack 30. Accordingly, the inner rack 30 may be configured to move forward or backward by an angle rotation force of the inner gear 27. The fastening rod 43 of the inner spacer 40 may be hinge-connected to the slots 31 of the inner spacer connecting bodies 32 integrally formed with the inner rack 30. Accordingly, as a result the inner spacer 40 may also moved forward or backward along with the inner rack 30.

Figure 6:
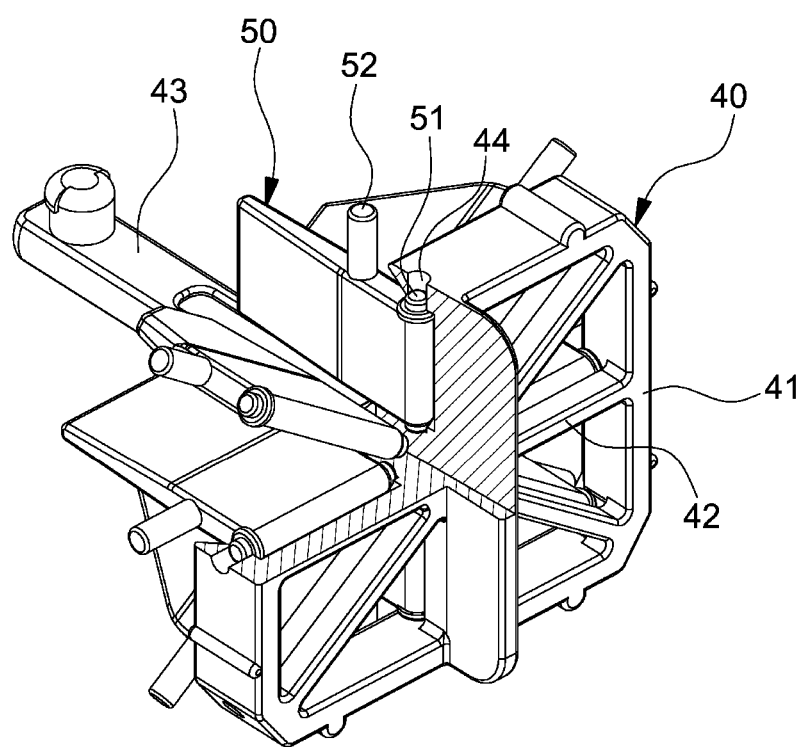
FIG. 6 is an exemplary perspective view illustrating a connection relationship between an inner spacer and a diffuser fan among the components of the air vent for a vehicle according to the exemplary embodiment of the present invention.

Furthermore, a diffuser fan 50 may be configured to adjust the air discharge mode to the concentration mode or the diffusion mode and may be hinge-connected between the outer case 41 of the inner spacer 40 and the fastening rod 43. For example, as illustrated in FIG. 6, a front end portion of the diffuser fan 50 may include a hinge pin 51 and the outer case 41 and the fastening rod 43 may include hinge apertures 44 to hinge-connect both ends of the hinge pin 51.

Figure 3:
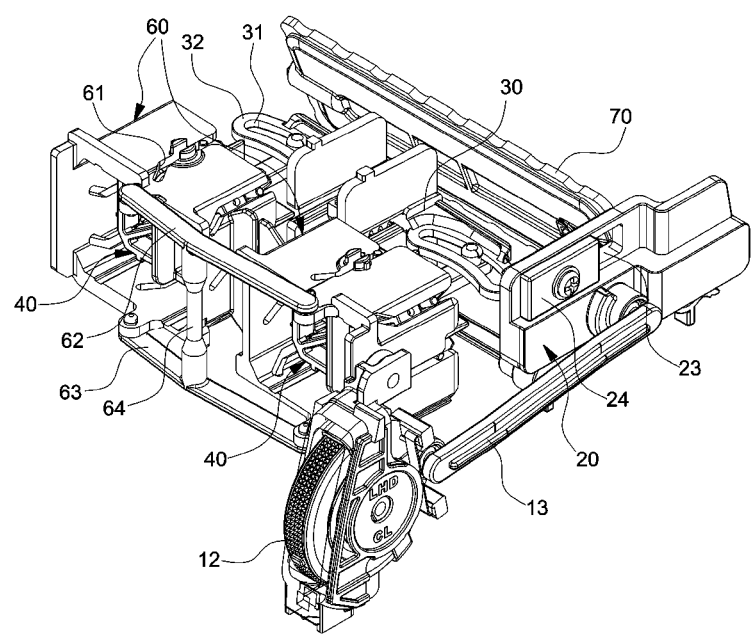
FIG. 3 is an exemplary perspective view illustrating an assembled state of the internal components of the air vent for a vehicle according to the exemplary embodiment of the present invention.
Figure 4:
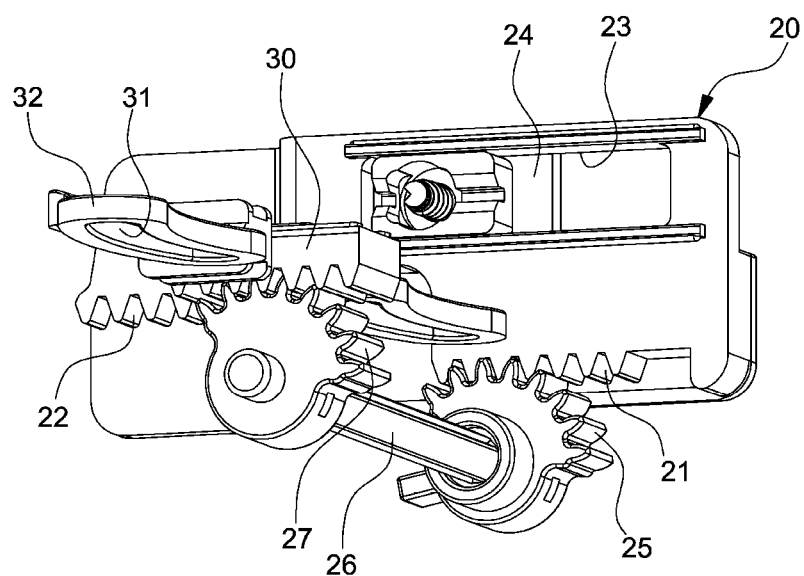
FIGS. 4 and 5 are exemplary perspective views illustrating a connection relationship between the internal components of the air vent for a vehicle according to the exemplary embodiment of the present invention.
Figure 5:
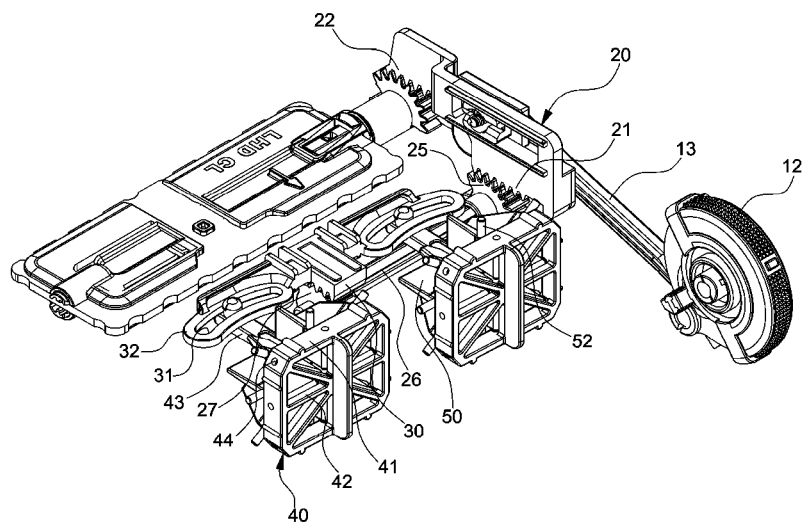

Further, as illustrated in FIG. 3 and FIG. 5, a guide pin 52 may integrally protrude at a first side surface of the diffuser fan 50. In other words, a position of a rear side of the hinge pin 51 and the guide pin 52 may be inserted into an outer spacer 60 and may be configured to move linearly and diagonally. The outer spacer 60 may have a hollow structure provided with a guide aperture 61 that may be configured to guide the linear movement and the diagonal movement of the guide pin 52. The outer spacers may be disposed to be spaced from each other and may enclose the outer of the inner spacer 40.

Figure 7A:
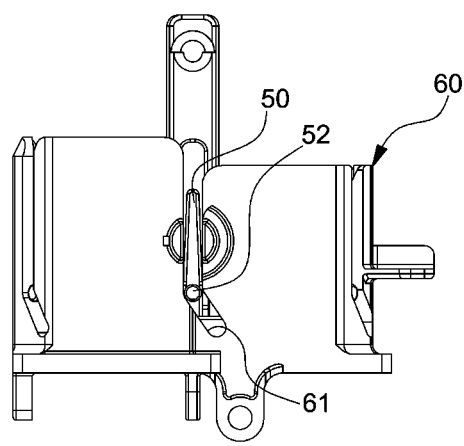
FIGS. 7A-7D are exemplary diagrams illustrating that an angle of the diffuser fan may be adjusted when the inner spacer among the components of the air vent for a vehicle according to the exemplary embodiment of the present invention moves forward and backward.
Figure 7B:
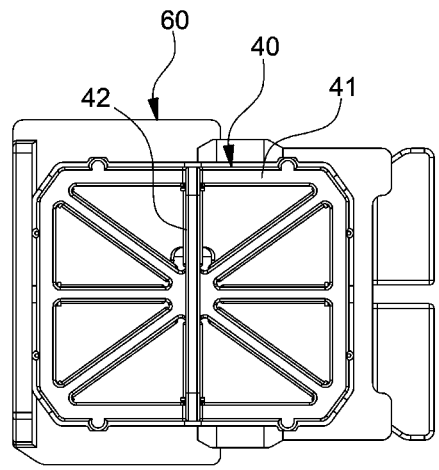
Figure 7C:
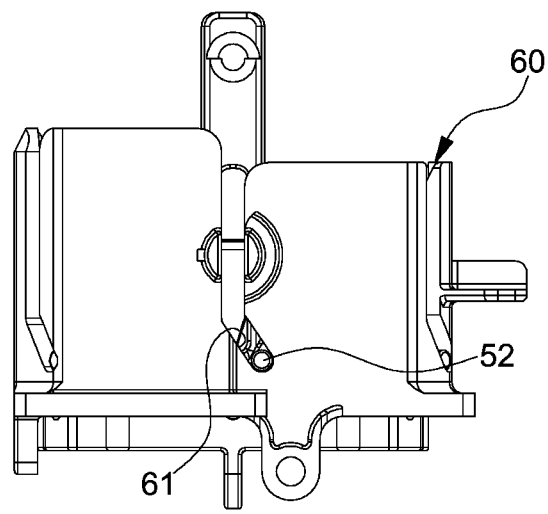
Figure 7D:
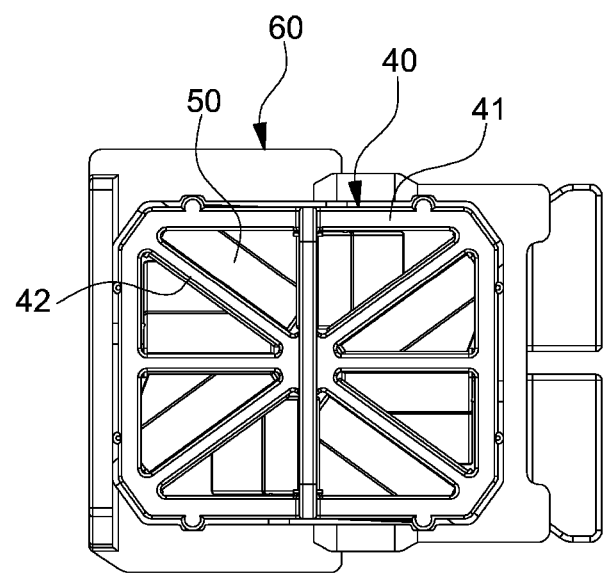

The guide aperture 61 may extend along a longitudinal direction of the outer spacer 60 and a back section of the guide aperture 61 may be formed in a linear section. A front section thereof may be formed in a diagonal section. Accordingly, when the guide pin 52 of the diffuser fan 50 is positioned in the linear section of the rear side of the guide aperture 61 of the outer spacer 60, as illustrated in FIGS. 7A-7B, the diffuser fans 50 may be arranged linearly in forward and backward directions. When the position of the guide pin 52 of the diffuser fan 50 is moved to the diagonal section of the front side of the guide aperture 61 of the outer spacer 60, as illustrated in FIGS. 7C-7D, the diffuser fans 50 may be arranged diagonally and may be configured to be rotated about a predetermined angle.

Further, the outer spacer 60 may be mounted with upper and lower horizontal rotating bars 62 and 63 and a vertical rotating bar 64 that may be connected to the knob 14, that may be used to adjust the discharge direction of air, that is, a wind angle laterally. In particular, when a pair of outer spacers 60 are arranged in parallel, the upper horizontal rotating bar 62 may be hinge-connected between upper end portions of the front sides of each of the outer spacers 60 and the lower horizontal rotating bar 63 may be hinge-connected between lower end portions of the front sides of each of the outer spacers 60. A vertical rotating bar 64 may connect between central portions of the upper and lower vertical rotating bars 62 and 63. The rear end portion of the knob 14 mounted in the air grill 11 on the front surface of the air vent housing 10 may be connected to the vertical rotating bar 64 and may be configured to transfer the angle rotation force.

Moreover, the second outer rack 22 formed on the outer rack plate 20 may engage a damper gear 71 that may be configured to open and close the damper to permit or interrupt the discharge of air. Further, a first side end of the damper 70 may be fastened with a central shaft of the damper gear 71 and a second side end of the damper 70 may be hinge-connected to an inner wall of the air vent housing 10. Accordingly, when the outer rack plate 20 is moves forward or backward, the damper gear 71 may be configured to rotate about the angle in a direction in which the damper is closed or opened and an opening angle of the damper 70 connected to the damper gear 71 may be adjusted to change a discharge amount of air.

For example, an operation flow of the air vent for a vehicle according to the exemplary embodiment of the present invention configured as described above will be described below. The dial 12 may be rotated in one direction, and the rod 13 may be configured to move backward based on the rotation angle of the dial 12 and at the same time the outer rack plate 20 hinge-connected to the rear end portion of the rod 13 may move backward.

Figure 8A:
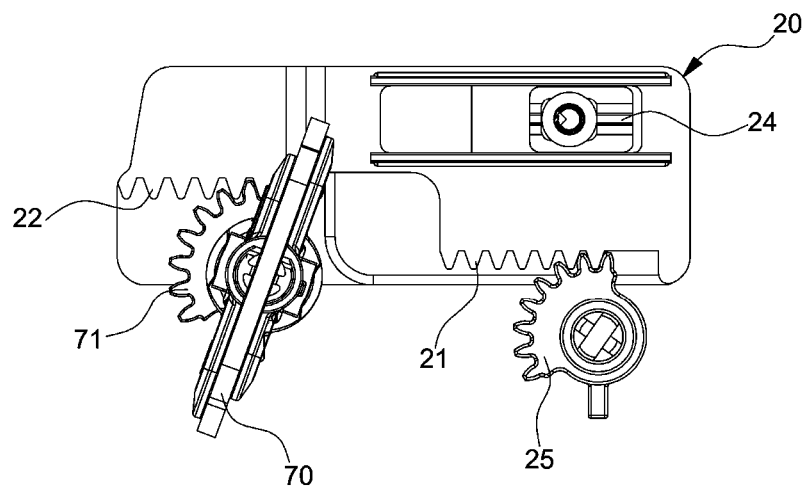
FIGS. 8A to 8C are exemplary side cross-sectional views illustrating an opening and closing operation state of a damper of the air vent for a vehicle according to the exemplary embodiment of the present invention.
Figure 9A:
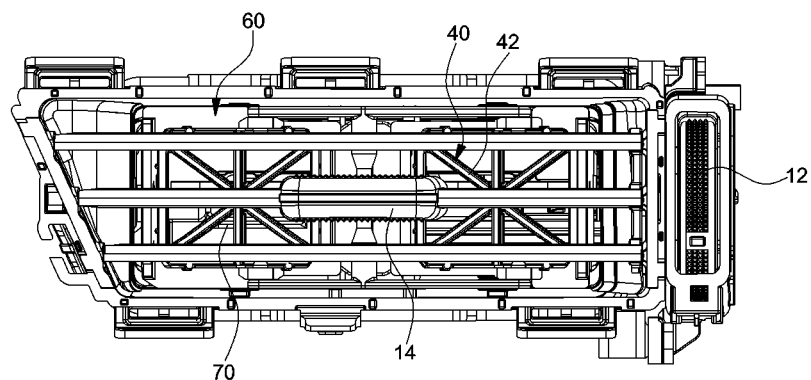
FIGS. 9A to 9C are exemplary front views illustrating an air discharge mode of the air vent for a vehicle according to the exemplary embodiment of the present invention.

Further, as illustrated in FIGS. 8A and 9A, when the outer rack plate 20 moves backward, the damper gear 71 may be configured to rotate about an angle in the damper closing direction and thus the damper 70 connected to the damper gear 71 is in a closed state, and the discharge of air for cooling and heating may be interrupted. Conversely, the dial 12 may be configured to be rotated by about 60° in an opposite direction based on the first direction (0°), the rod 13 may move forward based on the rotation angle of the dial 12 and at the same time the outer rack plate 20 hinge-connected to the rear end portion of the rod 13 may move forward (for example, about 11 mm).

Figure 8B:
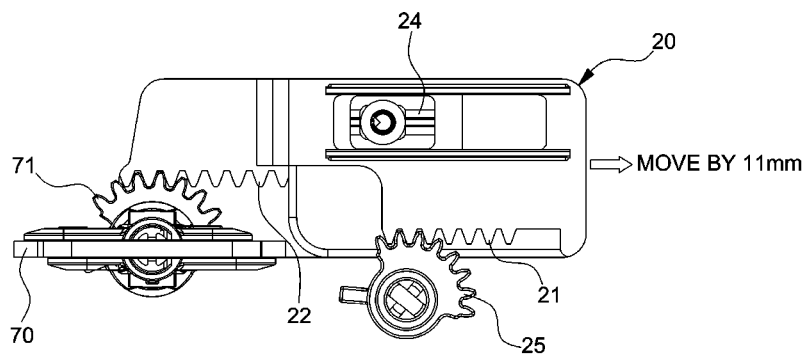
Figure 9B:
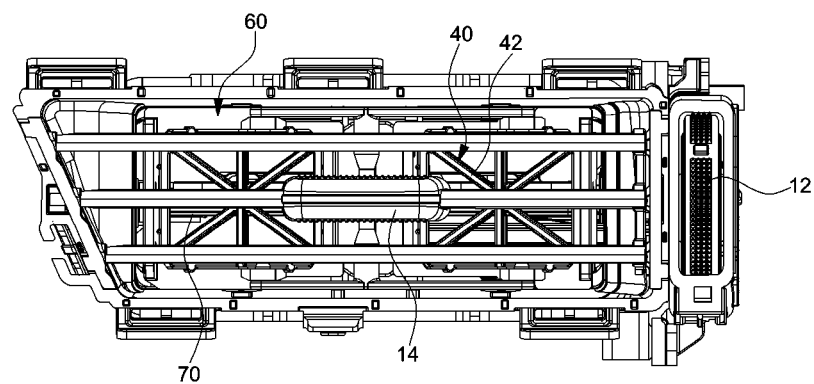

As illustrated in FIGS. 8B and 9B, when the outer rack plate 20 moves forward, the damper gear 71 may be configured to perform the angle rotation in the damper opening direction. The discharge of air for cooling and heating may be permitted when the damper 70 connected to the damper gear 71 is in a completely opened state. Further, when the outer rack plate 20 moves forward, the diffuser gear 25 may engage with the first outer rack 21. The diffuser shaft 26 connected to the diffuser gear 25, and the inner gear 27 mounted at a second end portion of the diffuser shaft 26 may be configured to perform the angle rotation in the same direction and the inner gear 27 may be configured to transfer the rotation force to the inner rack 30 in the forward direction.

Accordingly, the inner rack 30 may be configured to move forward, the inner spacer connecting bodies 32 integrated with the inner rack 30 may move forward, and the inner spacer 40 connected to the slots 31 of the inner spacer connecting bodies 32 by the fastening rod 43 may also move forward. In other words, even though the inner spacer 40 may also move forward, the diffuser fans 50 may be arranged linearly in the forward and backward directions.

As illustrated in FIG. 8A, the guide pin 52 of the diffuser fan 50 maintains the insertion position within the linear section in the section of the guide aperture 61 of the outer spacer 60. Therefore, the air discharge mode may adjust the concentration mode that discharges air by the diffuser fan 50 without resistance. Accordingly, the air may be discharged to the inner of the vehicle while having the straight flow, based on the concentration mode. For example, when a user performs an operation to rotate the dial 12 by about 60° in an opposite direction based on one direction (0°), and then rotates the dial 12 by about 10° more in the opposite direction, that is, rotates the dial 12 by about 70° in the opposite direction based on one direction (0°), the outer rack plate 20 may move (about 3 mm) a greater amount in the forward direction.

Simultaneously, when the outer rack plate 20 moves a greater amount in the forward direction, the diffuser gear 25 may engage with the first outer rack 21. The diffuser shaft 26 may be connected to the diffuser gear 25. The inner gear 27 may be mounted at the other end portion of the diffuser shaft 26 and may be configured to perform a greater amount of angle rotation in the same direction and the inner gear 27 may be configured to transfer a greater amount of rotational force to the inner rack 30 in the forward direction. Accordingly, the inner rack 30 may be configured to move forward, the inner space connecting bodies 32 integrated with the inner rack 30 may move a greater amount in the forward direction. The inner spacer 40 connected to the slots 31 of the inner spacer connecting bodies 32 by the fastening rod 43 may move a greater amount more in the forward direction.

Figure 8C:
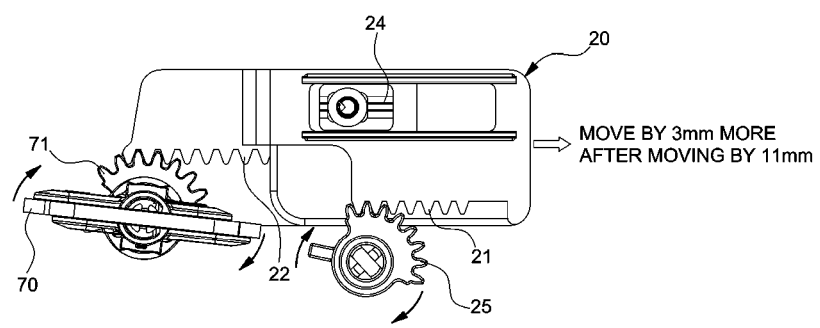

Further, when diffuser fans 50 are arranged diagonally, the inner spacer 40 may move a greater amount in the forward direction. As illustrated in FIG. 8B, the guide pin 52 of the diffuser fan 50 enters the diagonal section in the section of the guide aperture 61 of the outer spacer 60. In particular, as illustrated in FIG. 8C, as the outer rack plate 20 moves a greater amount in the forward direction the damper 70 may be arranged diagonally. The wind velocity for the diffusion discharge of air while permitting the discharge of air may be reduced.

Figure 9C:
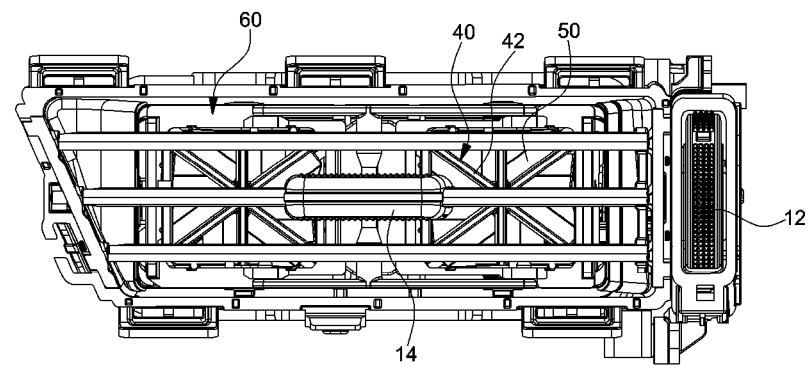

Therefore, as illustrated in FIG. 9C, the diffuser fan 50 may be configured to diffuse the discharge of air while being arranged diagonally. Accordingly, the diffusion mode may be performed when air for cooling and heating is discharged while being widely spread over the inner of the vehicle. Meanwhile, the angle rotation in the vertical direction of the air grill 11 by an operation of the knob 14 vertically controls the air discharge direction, and laterally controls the air discharge direction by adjusting the lateral wind angle mounted in the outer spacer 60.

In particular, when the knob 14 mounted on the front surface of the air vent housing is operated left or right, the operating force may be configured to be transferred to the vertical rotating bar 64 connected to the rear end portion of the knob 14. As a result, the upper and lower horizontal rotating bars 62 and 63 may be configured to move to the left side or the right side. Namely, the left or right moving force of the upper and lower horizontal rotating bars 62 and 63 may be transferred to the outer spacer 60, and as a result, the outer spacer 60 may be configured to rotate the angle in the left or right direction.

Simultaneously, the inner spacer 40 positioned within the outer spacer 60 may perform the angle rotation left or right based on a hinge connecting point (e.g., point hinge-connected to the slots 31) of the fastening rod 43. Accordingly, the discharge direction of air that passes through the internal space may be configured to be controlled left or right. As described above, the air discharge mode of the air conditioner may be configured to selectively adjust to the concentration mode, the diffusion mode, or the like. The discharge direction of air may be adjusted vertically or horizontally, thereby maintaining the inner air of the vehicle based on user preferences.

The invention has been described in detail with reference to exemplary embodiments thereof. However, it will be appreciated by those skilled in the art that the scope of the present invention is not limited to the exemplary embodiments as mentioned above and that changes may be made in these exemplary embodiments without departing from the principles and spirit of the invention, the scope of which is defined in the appended claims and their equivalents.

What is claimed is:

1. An air vent for a vehicle, comprising:
   a dial rotatably mounted at one side of a front surface of an air vent housing;
   a rod hinge-connected to a rear surface of the dial;
   an outer rack plate having at least two outer racks and hinge-connected to a rear end of the rod;
   a power transmission gear member is rotated for moving an inner spacer forward and backward when the outer rack plate is moved forward and backward;
   an inner spacer coupled to the power transmission gear member to be moved forward and backward;
   a group of diffuser blades having one side end provided with a hinge pin hinge-connected to the inner spacer and a guide pin that protrudes at a position of a rear side of the hinge pin;
   an outer spacer having a hollow structure provided with a guide aperture configured to guide a linear movement and a diagonal movement of the guide pin and disposed on the outer of the inner spacer;
   a damper gear engaged with the second outer rack; and
   a damper having a first side end fixed to a central shaft of the damper gear and a second side end hinge-connected to an inner wall of the air vent housing,
   wherein the outer rack plate has a slide aperture that penetrates the outer rack plate and the slide aperture has an outer rack cover which is coupled to a side surface of the air vent housing, and is configured to slide along and be movably inserted into the slide aperture.

2. The air vent for a vehicle of claim 1, wherein the power transmission gear member includes:
   a diffuser gear engaged with the first outer rack;
   a diffuser shaft having a first side end coupled to a central shaft of the diffuser gear;
   an inner gear coupled to a second side end of the diffuser shaft; and
   an inner rack configured to engage with the inner gear to move forward and backward.

3. The air vent for a vehicle of claim 2, wherein both side surfaces of the inner rack are provided with inner spacer connecting bodies having slots and a rear surface of the inner spacer is formed with a fastening rod hinge-connected to the slots.

4. The air vent for a vehicle of claim 2, wherein the inner spacer includes:
   a square ring shaped outer case;
   a partitioning bar formed on an inner surface of the outer case that separates an inner space of the outer case into a plurality of spaces; and
   a fastening rod that extends backward from a portion where inner side ends of each of the partitioning bars are connected and coupled to the inner rack.

5. The air vent for a vehicle of claim 4, wherein the outer case of the inner spacer and the fastening rod include hinge apertures having the hinge pins of the group of diffuser blades fastened thereto.

6. The air vent for a vehicle of claim 1, wherein the guide aperture is formed along a longitudinal direction of the outer spacer and a back section of the guide aperture is formed as a straight section and a front section thereof is formed as a diagonal section.

7. The air vent for a vehicle of claim 1, wherein a lateral wind angle of the outer spacer is configured to be controlled by each of upper and lower horizontal rotating bars, wherein the upper and lower horizontal rotating bars are hinge-connected between upper portions of front sides of a pair of outer spacers and between lower portions of the front sides thereof, the upper and lower horizontal rotating bars are coupled to each other by a vertical rotating bar, and the vertical rotating bar is coupled to a knob mounted on the front surface of the air vent housing configured to transfer an operating force.

8. The air vent for a vehicle of claim 1, wherein the outer rack plate includes a front side of an inner surface provided with a first outer rack, a rear side of the inner surface provided with a second outer rack, and an outer surface hinge-connected to the rear end of the rod such that the outer rack plate moves horizontally by the rod upon a rotation of the dial.

* * * * *